(12) United States Patent
Iwasaki et al.

(10) Patent No.: US 7,611,296 B2
(45) Date of Patent: Nov. 3, 2009

(54) OPTICAL APPARATUS INCLUDING DIAPHRAGM DEVICE

(75) Inventors: Youichi Iwasaki, Utsunomiya (JP); Shigeru Ogino, Laguna Niguel, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 11/464,747

(22) Filed: Aug. 15, 2006

(65) Prior Publication Data

US 2007/0053684 A1 Mar. 8, 2007

Related U.S. Application Data

(60) Provisional application No. 60/715,104, filed on Sep. 8, 2005, provisional application No. 60/728,127, filed on Oct. 19, 2005.

(51) Int. Cl.
*G03B 9/02* (2006.01)
*G03B 9/07* (2006.01)

(52) U.S. Cl. .................................................... 396/505

(58) Field of Classification Search ................. 396/449, 396/450, 451, 458, 460, 505, 507, 509; 359/739; 348/362, 363; 310/309, 328, 800
See application file for complete search history.

(56) References Cited

U.S. PATENT DOCUMENTS

| 6,545,384 B1 * | 4/2003 | Pelrine et al. ................ 310/309 |
| 6,657,670 B1 * | 12/2003 | Cheng ......................... 348/363 |
| 6,806,621 B2 * | 10/2004 | Heim et al. .................. 310/328 |
| 6,809,462 B2 | 10/2004 | Pelrine et al. |
| 6,891,317 B2 | 5/2005 | Pei et al. |
| 2006/0142634 A1 * | 6/2006 | Anstadt et al. ................ 600/16 |

FOREIGN PATENT DOCUMENTS

JP 3501216 10/2001

OTHER PUBLICATIONS

Electroactive Polymer (EAP) Actuators as Artificial Muscles, 2nd Ed., 2004, SPIE Press, p. 566.*
Pei et al., Multifunctional Electroelastomer Rolls, Mat. Res. Soc. Symp. Proc. vol. 698, 2002, pp. EE4.8.1-EE4.8.6.*
Yoseph Bar-Cohen, Electroactive Polymer (EAP) Actuators as Artifical Muscles, book, 2004, pp. 22-31, pp. 535-539, The Society of Photo-Optical Instrumentation Engineers, United States of America.
John D. W. Madden, Artificial Muscle Technology: Physical Principles and Naval Prospects, IEEE Journal of Oceanic Engineering, Jul. 2004, vol. 29 No. 3, pp. 207-728, IEEE, United States of America.
Steven Ashley, Artifical Muscles, Scientific American, Oct. 2003, Scientific American, Inc., United States of America.

* cited by examiner

*Primary Examiner*—Kenneth J Whittington
(74) *Attorney, Agent, or Firm*—Canon U.S.A., Inc., IP Division

(57) ABSTRACT

A lens apparatus includes a lens barrel, an image-capturing optical system, and a diaphragm device disposed in an optical path of the image-capturing optical system. The diaphragm device includes a plurality of diaphragm blades and an electroactive polymer actuator configured to move the plurality of diaphragm blades from a diaphragm-open state to a diaphragm-closed state and from a diaphragm-closed state to a diaphragm-open state.

2 Claims, 17 Drawing Sheets

OPTICAL APPARATUS INCLUDING DIAPHRAGM DEVICE

CROSS-REFERENCE TO RELATED APPLICATION

This application claims the benefit of U.S. Provisional Application No. 60/715,104, filed Sep. 8, 2005 and U.S. Provisional Application No. 60/728,127, filed Oct. 19, 2005, which are hereby incorporated by reference in their entirety.

BACKGROUND OF THE INVENTION

1. Field of the Invention

The present invention relates to image-capturing apparatuses, such as video cameras and electronic still cameras, and, more specifically, relates to optical apparatuses using electroactive polymer actuators. The invention relates particularly to a diaphragm device (light intensity adjustment device) disposed in an optical path in a lens barrel included in an image-capturing apparatus.

2. Description of the Related Art

Recently, the size of video cameras and electronic still cameras has been significantly reduced. At the same time, various small camera units for mobile phones have been developed. Thus, the need for reducing the size of lens units for capturing images has increased.

Conventionally, such video cameras and electronic still cameras have typically used electromagnetic motors as actuators for driving movable lenses and light adjustment diaphragms for automatic focus, zooming, hand-shake compensation, and light adjustment. Inside the lens barrel, an electromagnetic motor is provided. There is a need in reducing the size of the space occupied by the motor in the lens barrel since the size of lenses have been decreased along with the reduction in image size.

An electromagnetic motor includes a magnet and a coil. An electromagnetic motor uses the force that is generated in accordance with Fleming's rules at the magnet and the coil by applying an electric current to the coil disposed in the magnetic field of the magnet, as a driving force. To reduce the size of an actuator, the generated driving force per volume must be increased. Thus, to increase the driving force, the electric current applied to the electromagnetic actuator and the magnetic field generated at the magnet must be increased.

More specifically, the coil diameter must be increased to enable a large current to be applied; the number of coil windings must increased; or the size of the magnet must be increased to increase the density of magnetic flux. However, all of these approaches cause an increase in the size of the motor and, therefore, are not suitable for the recent trend in small image-capturing devices.

When driving a great load with a small driving force, typically, a combination of a deceleration mechanism and mechanical leverage is used. However, when a deceleration mechanism is used, the motor will be driven at a speed higher than the driving speed of the load. Therefore, there is a problem in that noise caused by, for example, driving the motor and operating the gears of the deceleration mechanism is generated. There is also a problem in that the addition of the deceleration mechanism and a mechanical component for supplying leverage causes an increase in size and cost. Another problem is that durability performance is reduced because a mechanical sliding member is provided.

Recently, active research of a polymer material that can be greatly distorted and that has a great generative force per volume has been carried out with the aim of application to the development of artificial muscles. An actuator has been developed by applying such technology. Such actuator does not require a deceleration mechanism because the distortion of the material is several orders of magnitude greater than known piezoelectric material, such as piezoelectric zirconate titanate (PZT), and the distortion of the material is directly transmitted to the load as a driving force.

Such materials includes electroactive polymers. Electroactive polymer typically include dielectric elastomer, ferroelectric polymer, liquid-crystal elastomer, and electrostrictive polymer (Y. Bar-Cohen, Ed., "Electro Active Polymers (EAP) as Artificial Muscles: Reality Potential and Challenges." 2nd Edition, pp. 22-P31, Bellingham, Wash.: SPIE Press, 2004).

In particular, for dielectric elastomer, there are acrylic and silicon dielectric elastomers. Acrylic dielectric elastomer has been receiving attention because the distortion of some types of acrylic dielectric elastomer is 380% or more. The generative force per volume of acrylic dielectric elastomer is a couple of orders of magnitude greater than a conventional electromagnetic motor. Thus, it is expected that the volume of the actuator can be reduced to less than one tenth of that of a conventional electromagnetic motor. Since the generative force and distortion are great, a deceleration mechanism and mechanical leverage, such as those described above, are not required. Therefore, a quiet and durable actuator can be produced.

The operation principle of this dielectric elastomer is described below for a flat dielectric elastomer.

A flat dielectric elastomer interposed between two electrodes is compressed (Maxwell stress) in the direction of the electric field by the electrostatic force generated between the electrodes when a voltage is applied to the electrodes, and, simultaneously, a pressure P is generated in a manner such that the pressure P spreads out in a direction orthogonal to the direction of the electrical field. The pressure P can be represented by Expression 1 (Y. Bar-Cohen, Ed., "Electro Active Polymers (EAP) as Artificial Muscles: Reality Potential and Challenges." 2nd Edition, pp. 535-539, Bellingham, Wash.: SPIE Press, 2004). This pressure P is used as a force for driving the actuator. As apparent from Expression 1, to increase the driving force, the dielectric permittivity of the material may be increased, the distance between the electrodes may be decreased, and the driving voltage may be increased.

$$P = \epsilon_r \epsilon_0 (V/t)_2 \quad (1)$$

where $\epsilon_r$ represents the relative permittivity of a film, $\epsilon_0$ represents the dielectric permittivity of a vacuum (=8.85×10-12 F/m), V represents the voltage between the electrodes, and t represents the distance between the electrodes.

The relationship between the displacement of the film and load can be represented by Expression 2 described below (Y. Bar-Cohen, Ed., "Electro Active Polymers (EAP) as Artificial Muscles: Reality Potential and Challenges." 2nd Edition, pp. 535-539, Bellingham, Wash.: SPIE Press, 2004):

$$\Delta l = l(0.5P - F/wt)/Y \quad (2)$$

where $\Delta l$ represents the displacement (stretching of film) of the actuator in the extraction direction the force, l represents the initial length of the film, P represents the generated pressure (Expression 1), F represents load, w represents the width of the film, t represents the thickness of the film, and Y represents Young's modulus.

A material such as elastic carbon is provided on an electrode above the dielectric elastomer. Acrylic dielectric elastomer (VHB4910 manufactured by 3M) and silicon dielectric elastomer are commercially available.

U.S. Pat. No. 6,891,317 describes a cylindrical actuator constructed by wrapping such a dielectric elastomer film around a compression coil spring. Depending on the structure of the electrodes, this cylindrical actuator functions as a one-dimensional linear actuator that extends and contracts in the axial direction or a two-dimensional flexion actuator in which the end portion of the cylinder bends. A push-pull actuator constructed of two cylindrical actuators is described in "Science American" (p. 58, October 2003). This compression coil spring applies a prestrain to the dielectric elastomer film in the peripheral direction and the axial direction. The strength of the dielectric elastomer film against damage by electrostatic discharge increases when prestrain is applied. Thus, by increasing the strength of the dielectric elastomer film by applying prestrain, the voltage applied to the film can be increased, and, consequently, the driving force can be increased. As a result, the size of the actuator can be reduced and the reliability of the actuator is improved. The strength against damage by electrostatic discharge of a silicon dielectric elastomer film is 110 to 350 MV/m and of acrylic dielectric elastomer film is 125 to 440 MV/m (J D W. Madden, "Artificial Muscle Technology: Physical Principles and Naval Prospects." IEEE Journal of Oceanic Engineering, Vol. 29, No. 3, July 2004).

U.S. Pat. No. 6,809,462 discusses the application of dielectric elastomer to a displacement sensor by detecting the change in electrical properties, such as capacitance and resistance of the dielectric elastomer caused by deformation of the dielectric elastomer. However, methods of detecting changes in capacitance and other values is not limited, and other methods, such as RCA radiofrequency resonator, are well known. Thus, a known detection circuit can be used to detect changes in electrical properties, such as resistance. An actuator using a piezoelectric element provided as a single unit with a sensor is also well known.

Next, an overview of the mechanical structure of a diaphragm device (light adjustment device) using a known actuator (e.g., electromagnetic actuator, such as a meter) will be described (refer to FIGS. 3, 6, and 9).

FIGS. 3A to 3C illustrate only the main components of a diaphragm device according to a first conventional example. FIG. 3A is a front view with a closed diaphragm; FIG. 3B is a front view with an open diaphragm; and FIG. 3C is a side view.

A first movable diaphragm blade 1 has a lateral oblong hole 1-*a* and longitudinal oblong holes 1-*b* and 1-*c*. A second movable diaphragm blade 2 has a lateral oblong hole 2-*a* and longitudinal oblong holes 2-*b* and 2-*c*. At both ends of a movable arm 3, pins 3-*a* and 3-*b* provided. A meter (driving source) 4 and fixed guide pins 5, 6, 7, and 8 are also provided. Light passes through an imaginary effective diameter 9.

The diaphragm device having the above-described structure operates as described below.

The pin 3-*a* of the arm 3 is engaged with the lateral oblong hole 1-*a* of the diaphragm blade 1. The longitudinal oblong holes 1-*b* and 1-*c* of the diaphragm blade 1 are engaged with the fixed guide pins 5 and 6, respectively.

The pin 3-*b* of the arm 3 is engaged with the lateral oblong hole 2-*a* of the diaphragm blade 2. The longitudinal oblong holes 2-*b* and 2-*c* of the diaphragm blade 2 are engaged with the fixed guide pins 7 and 8, respectively.

The meter 4 generates a rotationally reciprocating driving force to rotate the arm 3 around axis X in a reciprocating manner. When the arm 3 is rotated to the right (FIG. 3A), the diaphragm blade 1 moves upward and the diaphragm blade 2 moves downward, covering the effective diameter to close the diaphragm.

When the arm 3 is rotated to the left (FIG. 3B), the diaphragm blade 1 moves downward and the diaphragm blade 2 moves upward, being moved out of alignment with the effective diameter to open the diaphragm.

FIGS. 6A to 6C illustrate only the main components of a diaphragm device according to a second conventional example. FIG. 6A is a front view with a closed diaphragm; FIG. 6B is a front view with an open diaphragm; and FIG. 6C is a side view. A hole 11-*a* and an oblong hole 11-*b* are formed in a first movable diaphragm blade 11. A hole 12-*a* and an oblong hole 12-*b* are formed in a second movable diaphragm blade 12. A pin 13-*a* is provided at an end of a movable arm 13. A meter (driving source) 14 and fixed pins 15 and 16 are also provided. Light passes through an imaginary effective diameter 19.

The diaphragm device having the above-described structure operates as described below.

The pin 13-*a* of the arm 13 is engaged with the oblong hole 11-*b* of the diaphragm blade 11 and the hole 12-*b* of the diaphragm blade 12. The oblong hole 11-*a* of the diaphragm blade 11 and the hole 12-*a* of the diaphragm blade 12 are engaged with fixed pins 15 and 16, respectively. The meter 14 generates a rotationally reciprocating driving force to rotate the arm 13 around axis X in a reciprocating manner. When the arm 13 is rotated to the left (FIG. 6A), the diaphragm blade 11 rotates to the left around the pin 15 and the diaphragm blade 12 rotates to the right around the pin 16, covering the effective diameter to close the diaphragm. When the arm 13 is rotated to the right (FIG. 6B), the diaphragm blade 11 rotates to the right around the pin 15 and the diaphragm blade 12 rotates to the left around the pin 16, being moved out of alignment with the effective diameter to open the diaphragm.

FIGS. 9A to 9C illustrate only the main components of a diaphragm device according to a third conventional example. FIG. 9A is a front view with a closed diaphragm; FIG. 9B is a front view with an open diaphragm; and FIG. 9C is a side view.

A hole 21-*a* and an oblong hole 21-*b* are formed in a first movable diaphragm blade 21. A hole 22-*a* and an oblong hole 22-*b* are formed in a second movable diaphragm blade 22. A hole 23-*a* and an oblong hole 23-*b* are formed in a third movable diaphragm blade 23. A hole 24-*a* and an oblong hole 24-*b* are formed in a fourth movable diaphragm blade 24. A hole 25-*a* and an oblong hole 25-*b* are formed in a fifth movable diaphragm blade 25. A hole 26-*a* and an oblong hole 26-*b* are formed in a sixth movable diaphragm blade 26. Six pins 27-*a*1, 27-*a*2, 27-*a*3, 27-*a*4, 27-*a*5, and 27-*a*6 are provided on the ring portion of the rotary member 27. An oblong hole 27-*b* is provided on the lever portion of the rotary member 27. A pin 28-*a* is provided at the edge of a movable arm 28. A meter (driving source) 30 and fixed pins 31, 32, 33, 34, 35, and 36 are also provided. Light passes through an imaginary effective diameter 29.

The diaphragm device having the above-described structure operates as described below.

The meter 30 generates a rotationally reciprocating driving force to rotate the arm 28 around axis X in a reciprocating manner. Since the pin 28-*a* of the arm 28 is engaged with the oblong hole 27-*b* of the rotary member 27, when the arm 28 rotates to the right around axis X, the rotary member 27 rotates to the left around the optical axis O, whereas, when the arm 28 rotates to the left around axis X, the rotary member 27 rotates to the right around the optical axis O. The six pins 27-*a*1 to 27-*a*6 provided on the ring portion of the rotary member 27 are engaged with the oblong holes 21-b to 26-b, respectively, of the diaphragm blades 21 to 26. The holes 21-a to 26-a are engaged with fixed pins 31 to 36, respectively. In this way, when the rotary member 27 rotates to the left around the optical axis O, the diaphragm blades 21 to 26 rotate to the right around the fixed pins 31 to 36, covering the effective diameter to close the diaphragm. When the rotary member 27 rotates to the right around the optical axis O, the diaphragm blades 21 to 26 rotate to the left around the fixed pins 31 to 36, being moved out of alignment with the effective diameter to open the diaphragm.

In other words, when the arm 28 rotates to the right (FIG. 9A), the diaphragm blades 21 to 26 cover the effective diameter to close the diaphragm, whereas, when the arm 28 rotates to the left (FIG. 9A), the diaphragm blades 21 to 26 are moved out of alignment with the effective diameter to open the diaphragm.

The diaphragm device according to a conventional example includes a meter powered by an electromagnetic force as a driving source.

As described above, with a known diaphragm device using an electromagnetic actuator, the volume of the actuator is great. For example, the volume of the actuator is about φ8×8=402 mm³, and the area viewed from the direction of the optical axis as large as the diameter of an open diaphragm. Therefore, the actuator has been an obstacle to reducing the size of the diaphragm device.

The mechanical structure of the diaphragm device according to the above-described conventional examples, the meter is disposed in a space other than where the effective diameter (i.e., opening) and other members (i.e., arm, rotary member, and diaphragm blade) are disposed. Therefore, the size of the meter was a great factor determining the size and weight of the diaphragm device. Since the meter accommodates mechanisms and members for converting an electromagnetic force into mechanical movement, the number of components included in the device was great, and the components were expensive.

SUMMARY OF THE INVENTION

A lens apparatus includes a lens barrel, an image-capturing optical system, and a diaphragm device disposed in an optical path of the image-capturing optical system. The diaphragm device includes a plurality of diaphragm blades and an electroactive polymer actuator configured to move the plurality of diaphragm blades from a diaphragm-open state to a diaphragm-closed state and from a diaphragm-closed state to a diaphragm-open state.

Further features of the present invention will become apparent from the following description of exemplary embodiments (with reference to the attached drawings).

DESCRIPTION OF THE EMBODIMENTS

First Embodiment

Figure 1A:
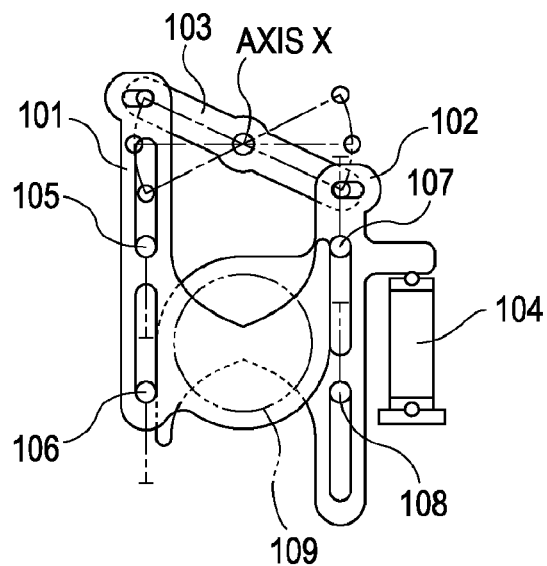
FIGS. 1A, 1B, and 1C illustrate the structure of a diaphragm device according to a first embodiment.

The structure and operation of an electroactive polymer actuator used for driving a diaphragm device of an optical apparatus according to the embodiments of the present invention will be described below.

FIGS. 13 to 17 illustrate the structure of the electroactive polymer actuator used in the diaphragm device according to this embodiment. In these drawings, the same components are represented by the same reference numerals.

The drawings illustrate cylindrical electroactive polymers 851 and 851' (hereinafter simply referred to as "polymers"). In the embodiments, the acrylic or silicon dielectric elastomer discussed in U.S. Pat. No. 6,891,317 or a material having the characteristics of Table 1 in "J D W. Madden, "Artificial Muscle Technology: Physical Principles and Naval Prospects." IEEE Journal of Oceanic Engineering, Vol. 29, No. 3, July 2004" is used, but the material used in the embodiments is not limited. Holding members 852, 852', 853, 853', and 855 are mechanical members for holding polymers 851 and 851' and are adhesively fixed to both ends of the polymers 851 and 851'. The holding members 852 and 855 have keys 862 and 863 used for mechanically connecting a load. In this embodiment, the driving force of the actuator is extracted by the keys 862 and 863. A plate 854 applies prestrain to the polymer 851. The total length of the plate 854 is a longer than the total length of the actuators, shown in FIGS. 14 and 16, by a predetermined amount. In this embodiment, the polymers 851 and 851' have the same length. However, the lengths may have different lengths depending in which apparatus they are included. This embodiment provides a two-phase electroactive polymer actuator including the polymers 851 and 851'.

Figure 13:
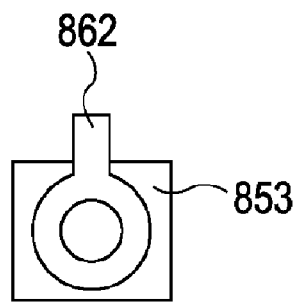
FIGS. 13 to 21 illustrate actuators included in diaphragm devices according to embodiments of the present invention.
Figure 14:
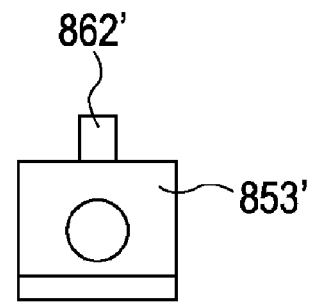
Figure 16:
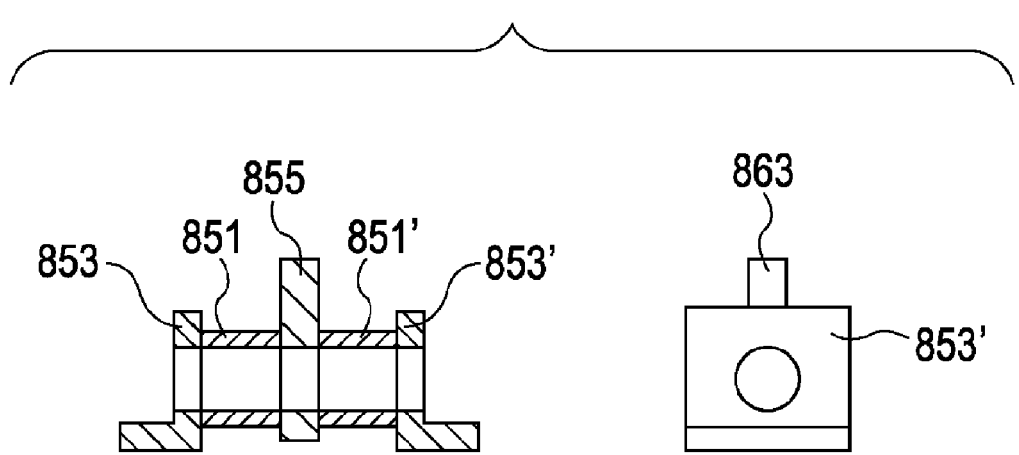

The actuators illustrated in FIGS. 14 and 16 differ in that the actuator in FIG. 14 include two of the units shown in FIG. 13, whereas the actuator in FIG. 16 is produced as a single unit by adhesively fixing both polymers 851 and 851' to the holding member 855. The actuator shown in FIG. 16 is advantageous in that a fixing member is not required and the size can be reduced.

As described above, it is well known that the characteristics, such as resistance to electrostatic breakdown, of the actuator can be improved by applying a predetermined prestrain to a polymer. With this embodiment, prestrain is applied to the unit illustrated in FIG. 14 or 16 in the axis direction by using the plate 854. While the polymer 851 or 851' of the unit illustrated in FIG. 14 or 16 is stretched within the range of elastic deformation in the axial direction with an attachment jig that is not illustrated in the drawings, the holding member 853 or 853' is fixed to the plate 854. To construct a unit of an operational actuator using the plate 854, the characteristics of the actuator can be easily controlled. However, the plate 854 according to this embodiment is not necessarily required, and the unit illustrated in FIG. 14 or 16 can be directly fixed inside the lens barrel while being stretched in the axial direction.

Figure 15:
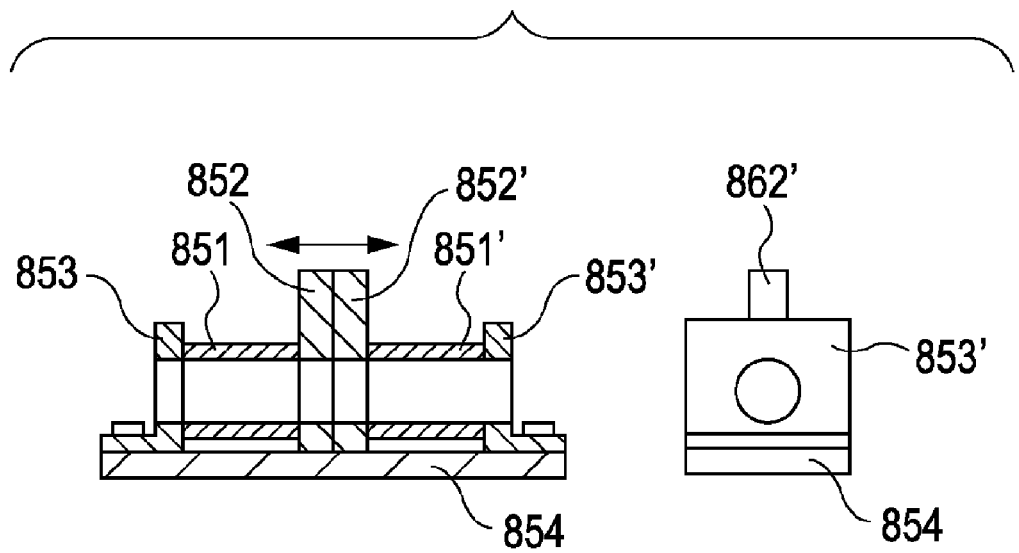

In the two-phase electroactive polymer actuator illustrated in FIG. 15, when a driving voltage is applied to the polymer 851 (i.e., conductive state), the polymer 851 stretches and the holding members 852 and 852' move toward the polymer 851' side. When a driving voltage is applied to the polymer 851', the holding members 852 and 852' move toward the polymer 851 side.

Figure 17:
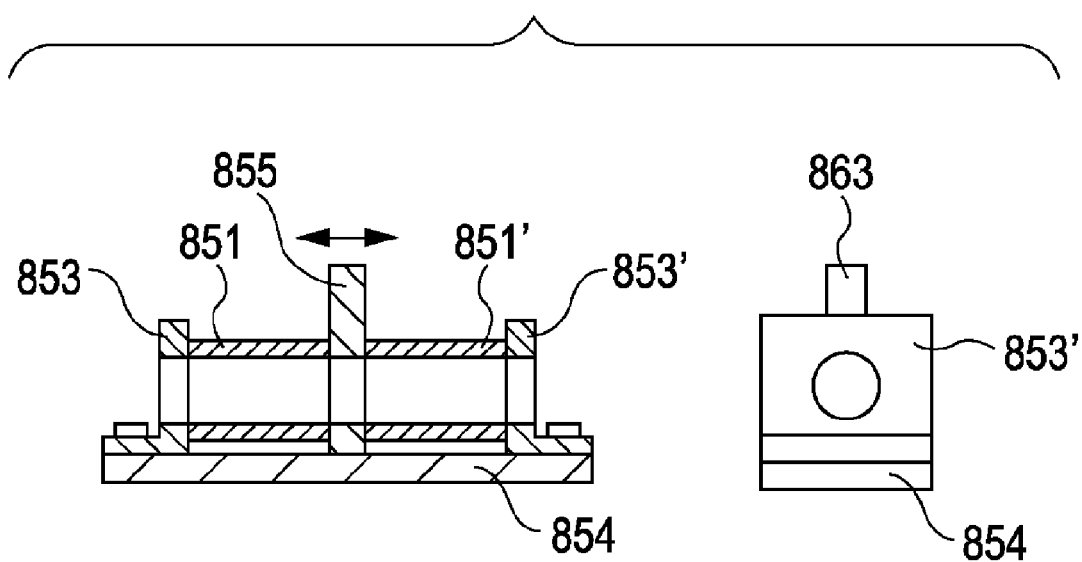

In the two-phase electroactive polymer actuator illustrated in FIG. 17, when a driving voltage is applied to the polymer 851, the polymer 851 stretches and the holding member 855 moves toward the polymer 851' side. When a driving voltage is applied to the polymer 851', the polymer 851' stretches and the holding member 855 moves toward the polymer 851 side.

In the two-phase electroactive polymer actuator illustrated in FIG. 15 or 17, when a driving voltage is not applied to the polymer 851 or 851' (i.e., non-conductive state), the holding members 852 and 852' or the holding member 855 stay in an intermediate position.

Next, another structure of an electroactive polymer actuator used in a diaphragm apparatus according to another embodiment will be described. In this embodiment, the displacement and force of one electroactive polymer actuator is used. The structure of the actuator is illustrated in FIGS. 18A and 18B.

Figure 18A:
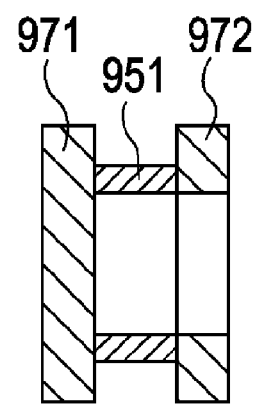
Figure 18B:
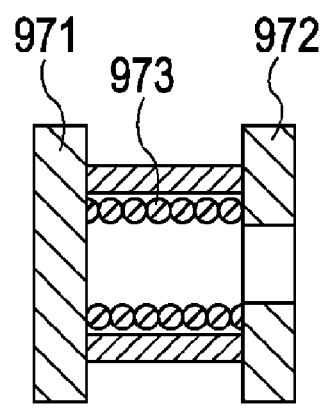

FIGS. 18A and 18B illustrate a single-phase electroactive polymer actuator whose entire length is stretched when a driving voltage is applied. As shown in FIGS. 18A and 18B, a cylindrical polymer 951 is adhesively fixed to holding members 971 and 972. A compression coil spring 973 is disposed inside the polymer 951. A prestrain is applied to the polymer 951 until it reaches the state illustrated in FIG. 18B. The material of the polymer 951 is the same as that in the above-described embodiment. In this embodiment, the compression coil spring 973 is disposed inside the cylindrical polymer 951. However, a spring may be disposed on the outside of the polymer 951. FIG. 18A illustrates the single-phase electroactive polymer actuator, illustrated in a non-conductive state, whereas FIG. 18B illustrates a conductive state in which a driving voltage is applied to the polymer 951, causing the polymer 951 to be stretched.

Next, diaphragm devices according to embodiments of the present invention will be described with reference to the drawings.

Diaphragm devices according first to sixth embodiments use the single-phase electroactive polymer actuator illustrated in FIGS. 18A and 18B.

Figure 1B:
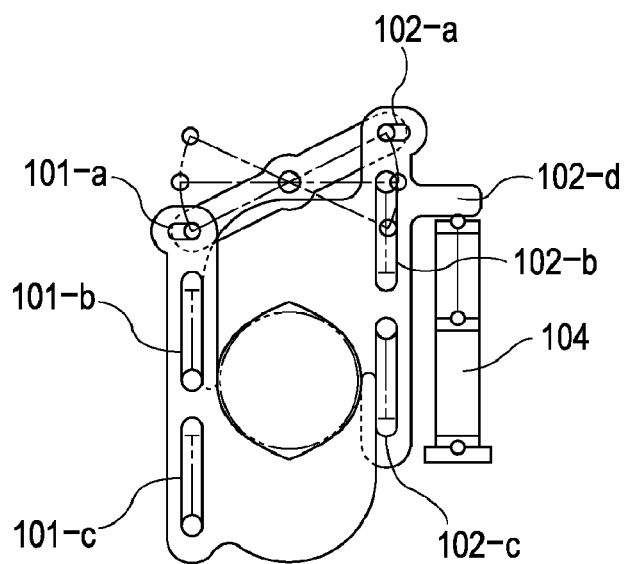
Figure 1C:
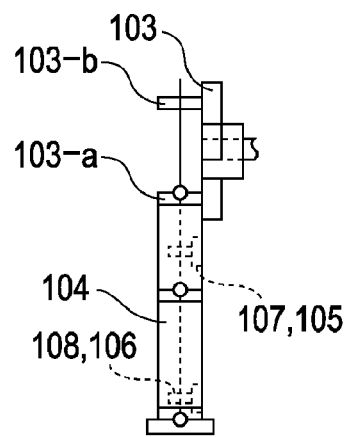

FIGS. 1A to 1C illustrate a diaphragm device according to the first embodiment including an electroactive polymer actuator used as a driving source. FIG. 1A is a front view of the diaphragm device with the diaphragm closed; FIG. 1B is a front view of the diaphragm device with the diaphragm open; and FIG. 1C is a side view of the diaphragm device. As illustrated in FIGS. 1A to 1C, a first movable diaphragm blade 101 has a lateral oblong hole 101-$a$ and longitudinal oblong holes 101-$b$ and 101-$c$, a second movable diaphragm blade 102 has a lateral oblong hole 102-$a$, longitudinal oblong holes 102-$b$ and 102-$c$. The second movable diaphragm blade 102 also has a projection 102-$d$. On both ends a movable arm 103, pins 103-$a$ and 103-$b$ are provided. A first end of a cylindrical electroactive polymer actuator (driving source) 104 is fixed. The drawings also illustrate fixed guiding pins 105, 106, 107, and 108, and an imaginary effective diameter 109 where light passes through.

The diaphragm device having the above-described structure operates as described below.

The pin 103-$a$ of the arm 103 is engaged with the lateral oblong hole 101-$a$ of the diaphragm blade 101, and the longitudinal oblong holes 101-$b$ and 101-$c$ of the diaphragm blade 101 are engaged with the fixed guiding pins 105 and 106, respectively. The pin 103-$b$ of the arm 103 is engaged with the lateral oblong hole 102-$a$ of the diaphragm blade 102, and the longitudinal oblong holes 102-$b$ and 102-$c$ of the diaphragm blade 102 are engaged with the fixed guiding pins 107 and 108, respectively.

A first end of an electroactive polymer actuator 104 is fixed, and a second end is coupled with the projection 102-$d$ of the diaphragm blade 102. When the electroactive polymer actuator 104 extends and contracts, the arm 103 rotates in a reciprocating manner around axis X in conjunction with the vertical movement of the diaphragm blade 102. When a driving voltage is not applied to the electroactive polymer actuator 104 (i.e., non-conductive state), the diaphragm blade 102 is kept at the lower position, the arm 103 is kept in a position rotated toward the right (refer to FIG. 1A), and the diaphragm blade 102 is kept at the upper position. The diaphragm blades 101 and 102 cover the effective diameter 109, closing the diaphragm. When a driving voltage is applied to the electroactive polymer actuator 104, the electroactive polymer actuator 104 extends. Consequently, the diaphragm blade 102 moves upward, the arm 103 rotates to the left (refer to FIG. 1B), and the diaphragm blade 101 moves downward. The diaphragm blades 101 and 102 move out of the effective diameter 109, opening the diaphragm. By changing the voltage applied to the electroactive polymer actuator 104, the stretching of the electroactive polymer actuator 104 changes. As a result, the positions of the diaphragm blades 101 and 102, and the size of the diaphragm defined by the diaphragm blades 101 and 102 changes, changing the aperture value. When the application of the voltage to the electroactive polymer actuator 104 is stopped (i.e. non-conductive state), the electroactive polymer actuator 104 contracts, and the diaphragm blades 101 and 102 cover the effective diameter 109, closing the diaphragm. This diaphragm-closed state is maintained.

Figure 2A:
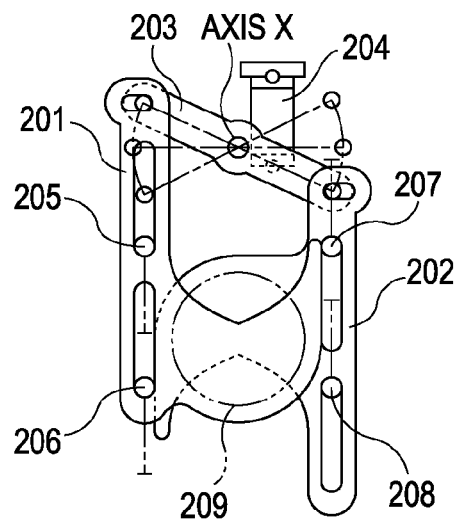
FIGS. 2A, 2B, and 2C illustrate the structure of a diaphragm device according to a second embodiment.
Figure 2B:
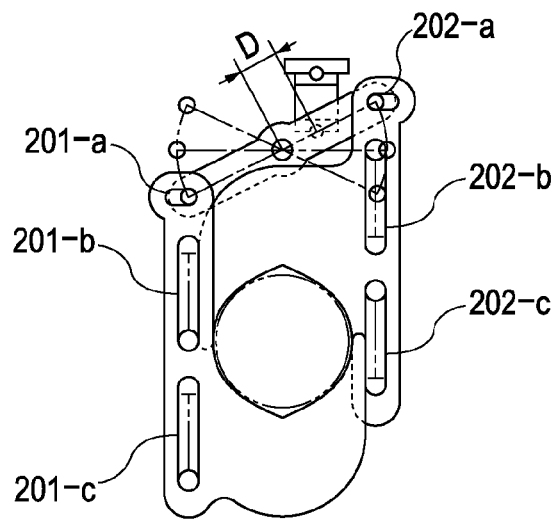
Figure 2C:
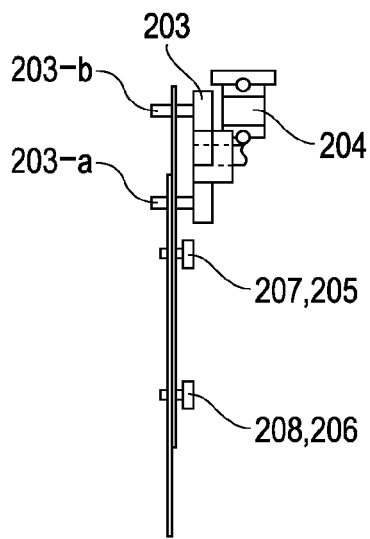
Figure 3A:
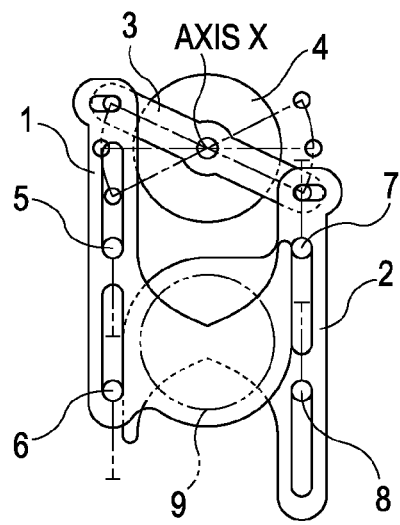
FIGS. 3A, 3B, and 3C illustrate the structure of a known diaphragm device.
Figure 3B:
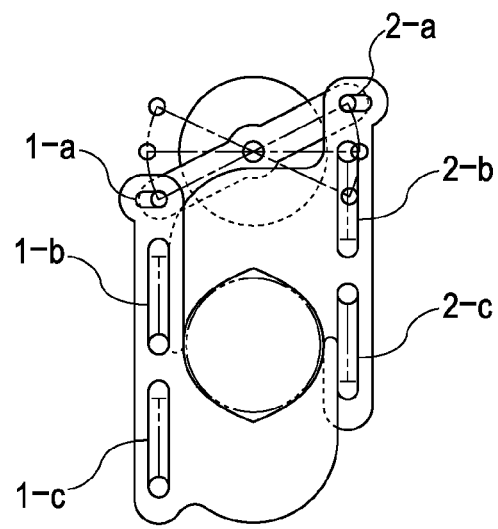
Figure 3C:
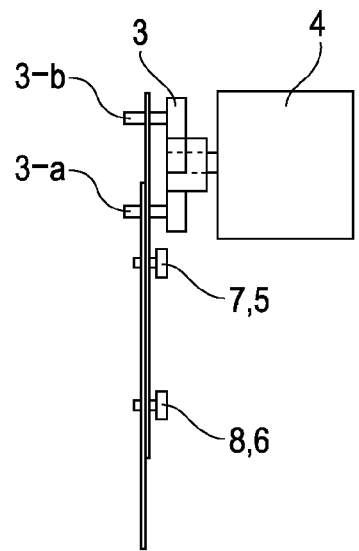

FIGS. 2A to 2C illustrate a diaphragm device according to a second embodiment including an electroactive polymer actuator used as a driving source. FIG. 2A is a front view of the diaphragm device with the diaphragm closed; FIG. 2B is a front view of the diaphragm device with the diaphragm open; and FIG. 2C is a side view of the diaphragm device. As illustrated in FIGS. 2A to 2C, a first movable diaphragm blade 201 has a lateral oblong hole 201-$a$ and longitudinal oblong holes 201-$b$ and 201-$c$. A second movable diaphragm blade 202 has a lateral oblong hole 202-$a$, longitudinal oblong holes 202-$b$ and 202-$c$, a projection 202-$d$. A movable arm 203 has pins 203-$a$ and 203-$b$ on both ends and a projection 203-$c$ provided at a position a predetermined distance D from axis X. A first end of a cylindrical electroactive polymer actuator (driving source) 204 is fixed. The drawings also illustrate fixed guiding pins 205, 206, 207 and 208, and an imaginary effective diameter 209 where light passes through.

The diaphragm device having the above-described structure operates as described below.

The pin 203-$a$ of the arm 203 is engaged with the lateral oblong hole 201-$a$ of the diaphragm blade 201, and the longitudinal oblong holes 201-$b$ and 201-$c$ of the diaphragm blade 201 are engaged with the fixed guiding pins 205 and 206, respectively. The pin 203-*b* of the arm 203 is engaged with the lateral oblong hole 202-*a* of the diaphragm blade 202, and the longitudinal oblong holes 202-*b* and 202-*c* of the diaphragm blade 202 are engaged with the fixed guiding pins 207 and 208, respectively. A first end of an electroactive polymer actuator 204 is fixed, and a second end is coupled with the projection 203-*c* of the arm 203. When the electroactive polymer actuator 204 extends and contracts, the arm 203 rotates in a reciprocating manner around axis X in conjunction with the vertical movement of the diaphragm blade 202. When a driving voltage is applied to the electroactive polymer actuator 204, the electroactive polymer actuator 204 stretches. Consequently, the arm 203 rotates to the right (refer to FIG. 2A), causing the diaphragm blade 201 to move upward and the diaphragm blade 202 to move downward. As a result, the diaphragm blades 201 and 202 cover the effective diameter 209, closing the diaphragm. When the application of a driving voltage to the electroactive polymer actuator 204 is stopped, the electroactive polymer actuator 204 contracts. Consequently, the arm 203 rotates to the left (refer to FIG. 2B), causing the diaphragm blade 201 to move downward and the diaphragm blade 202 to move upward. As a result, the diaphragm blades 201 and 202 move away from the effective diameter 209, opening the diaphragm.

Figure 4A:
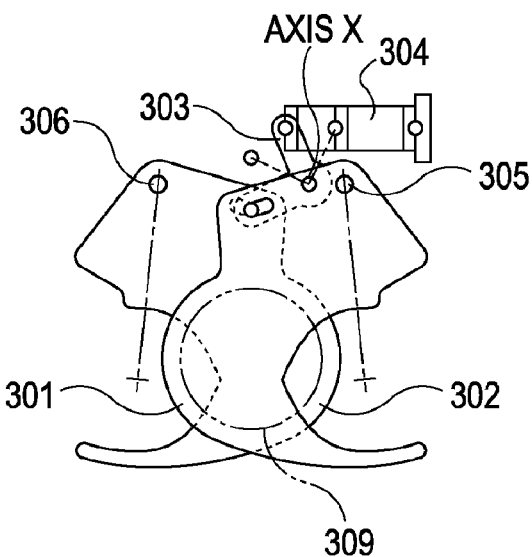
FIGS. 4A, 4B, and 4C illustrate the structure of a diaphragm device according to a third embodiment.
Figure 4B:
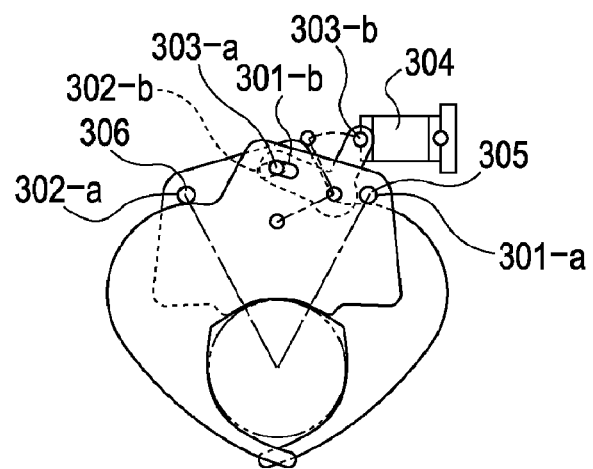
Figure 4C:
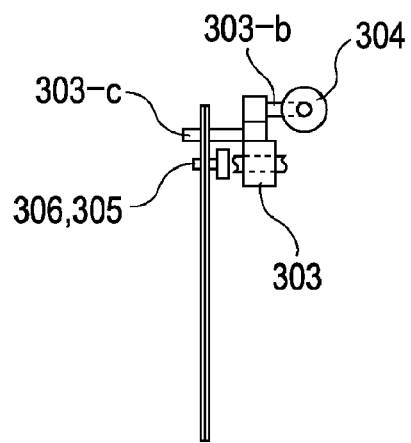

FIGS. 4A to 4C illustrate a diaphragm device according to a third embodiment. FIG. 4A is a front view of the diaphragm device with the diaphragm closed; FIG. 4B is a front view of the diaphragm device with the diaphragm open; and FIG. 4C is a side view of the diaphragm device. As illustrated in FIGS. 4A to 4C, a first movable diaphragm blade 301 has a hole 301-*a* and an oblong hole 301-*b*. A second movable diaphragm blade 302 has a hole 302-*a* and an oblong hole 302-*b*. A movable arm 303 has sub-arms 303-*c* and 303-*d* extending in two different directions. Pins 303-*a* and 303-*b* are formed at the tips of the sub-arms 303-*c* and 303-*d*, respectively. A first end of a cylindrical electroactive polymer actuator (driving source) 304 is fixed, whereas a second end is coupled with the pin 303-*b* of the arm 303. The drawings also illustrate fixed pins 305 and 306, and an imaginary effective diameter 309 where light passes through.

The diaphragm device having the above-described structure operates as described below.

The pin 303-*a* of the arm 303 is engaged with the oblong hole 301-*b* of the diaphragm blade 301 and the hole 302-*b* of the diaphragm blade 302. The hole 301-*a* of the diaphragm blade 301 and hole 302-*a* of the diaphragm blade 302 are engaged with the pins 305 and 306, respectively. The electroactive polymer actuator 304 stretches when a driving voltage is applied. When the application of the voltage to is stopped, the electroactive polymer actuator 304 contracts and stays contracted. The stretching and contracting of the electroactive polymer actuator 304 is used as a driving force to rotate the arm 303 around axis X in a reciprocating manner. In this way, when the arm 303 rotates to the left (refer to FIG. 4A), the diaphragm blade 301 rotates to the left around the pin 305 and the diaphragm blade 302 rotates to the right around the pin 306. Consequently, the diaphragm blades 301 and 302 cover the effective diameter 309, closing the diaphragm. When the arm 303 rotates to the right (refer to FIG. 4B), the diaphragm blade 301 rotates to the right around the pin 305 and the diaphragm blade 301 rotates to the left around the pin 306. Consequently, the diaphragm blades 301 and 302 move away from the effective diameter 309, opening the diaphragm.

Figure 5A:
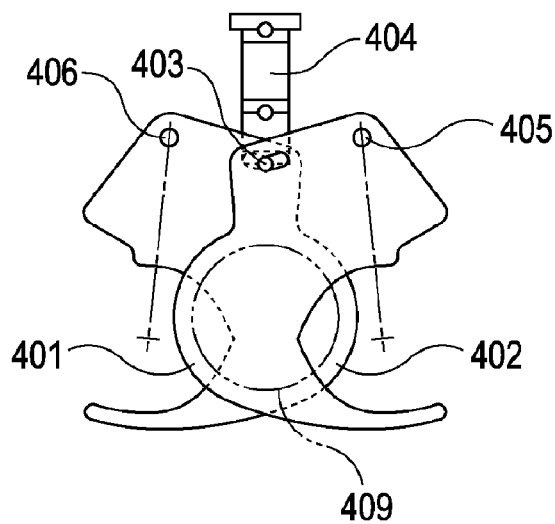
FIGS. 5A, 5B, and 5C illustrate the structure of a diaphragm device according to a fourth embodiment.
Figure 5B:
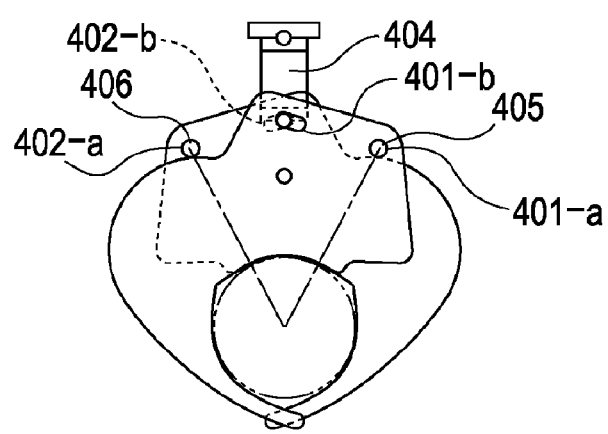
Figure 5C:
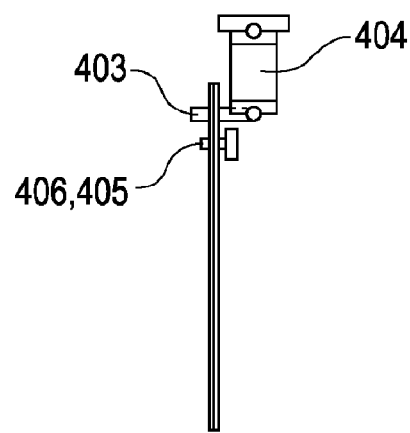
Figure 6A:
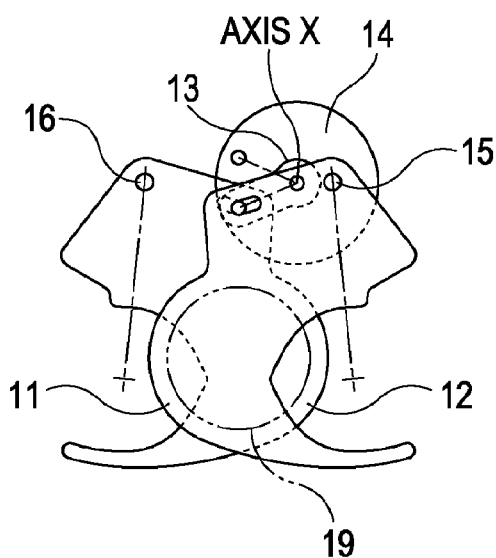
FIGS. 6A, 6B, and 6C illustrate the structure of another known diaphragm device.
Figure 6B:
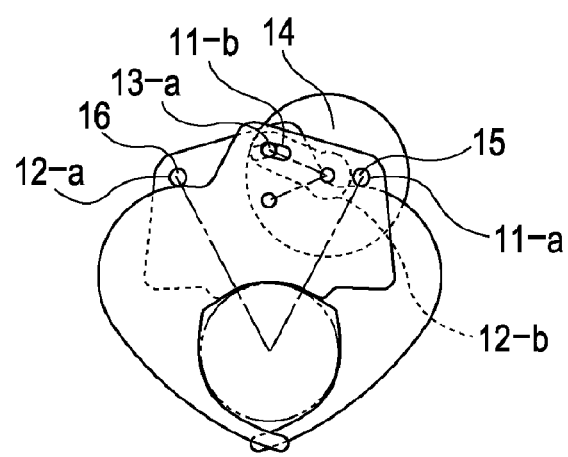
Figure 6C:
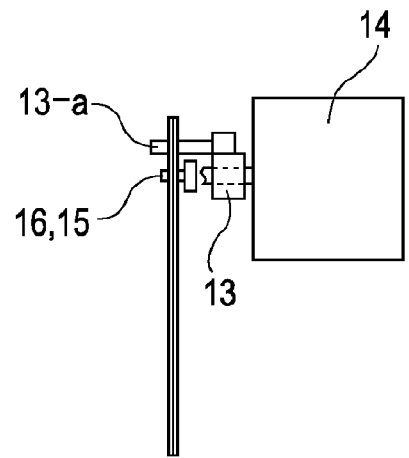

FIGS. 5A to 5C illustrate a diaphragm device according to a fourth embodiment. FIG. 5A is a front view of the diaphragm device with the diaphragm closed; FIG. 5B is a front view of the diaphragm device with the diaphragm open; and FIG. 5C is a side view of the diaphragm device. As illustrated in FIGS. 5A to 5C, a first movable diaphragm blade 401 has a hole 401-*a* and an oblong hole 401-*b*. A second movable diaphragm blade 402 has a hole 402-*a* and an oblong hole 402-*b*. A movable pin 403 is provided. A first end of a cylindrical electroactive polymer actuator (driving source) 404 is fixed, where as a second end is coupled with the pin 403. The drawings also illustrate fixed pins 405 and 406, and an imaginary effective diameter 409 where light passes through.

The diaphragm device having the above-described structure operates as described below.

The pin 403 is engaged with the oblong hole 401-*b* of the diaphragm blade 401 and the hole 402-*b* of the diaphragm blade 402. The hole 401-*a* of the diaphragm blade 401 and hole 402-*a* of the diaphragm blade 402 are engaged with the fixed pins 405 and 406, respectively. The electroactive polymer actuator 404 stretches when a driving voltage is applied. When the application of the voltage to is stopped, the electroactive polymer actuator 404 contracts and stays contracted. The stretching and contracting of the electroactive polymer actuator 404 is used as a driving force to vertically move the pin 403 in a reciprocating manner. In this way, when the pin 403 is moved to the lower position (refer to FIG. 5A), the diaphragm blade 401 rotates to the left around the pin 405 and the diaphragm blade 402 rotates to the right around the pin 406. Consequently, the diaphragm blades 401 and 402 cover the effective diameter 409, closing the diaphragm. When the pin 403 is moved to the upper position (refer to FIG. 5B), the diaphragm blade 401 rotates to the right around the pin 405 and the diaphragm blade 402 rotates to the left around the pin 406. Consequently, the diaphragm blades 401 and 402 move away from the effective diameter 409, opening the diaphragm.

Figure 7A:
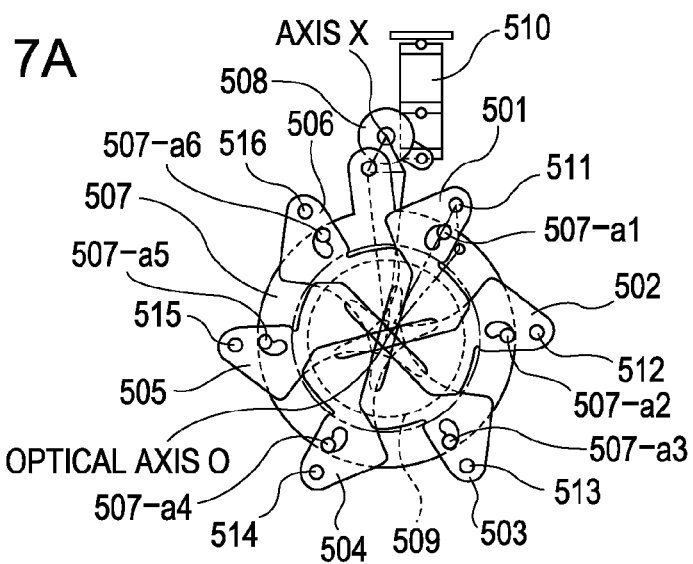
FIGS. 7A, 7B, and 7C illustrate the structure of a diaphragm device according to a fifth embodiment.
Figure 7B:
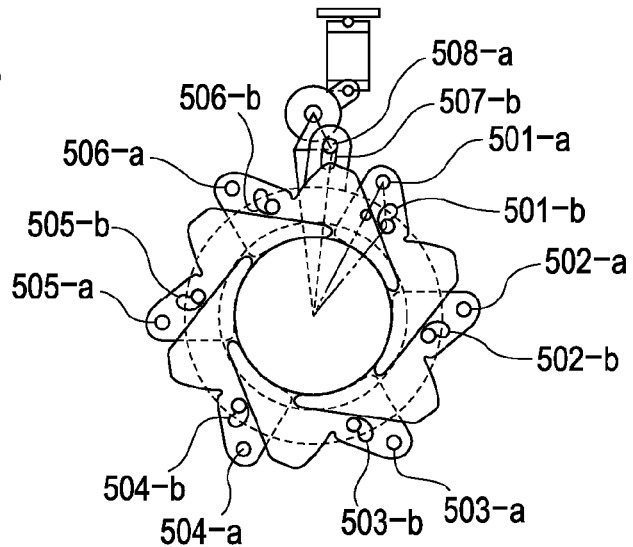
Figure 7C:
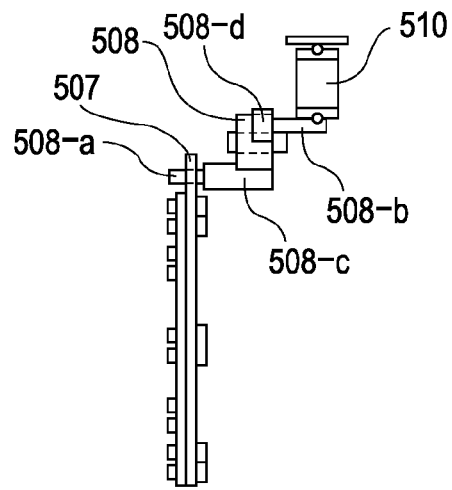

FIGS. 7A to 7C illustrate a diaphragm device according to a fifth embodiment. FIG. 7A is a front view of the diaphragm device with the diaphragm closed; FIG. 7B is a front view of the diaphragm device with the diaphragm open; and FIG. 7C is a side view of the diaphragm device. As illustrated in FIGS. 7A to 7C, a first movable diaphragm blade 501 has a hole 501-*a* and an oblong hole 501-*b*. A second movable diaphragm blade 502 has a hole 502-*a* and an oblong hole 502-*b*. A third movable diaphragm blade 503 has a hole 503-*a* and an oblong hole 503-*b*. A fourth movable diaphragm blade 504 has a hole 504-*a* and an oblong hole 504-*b*. A fifth movable diaphragm blade 505 has a hole 505-*a* and an oblong hole 505-*b*. A sixth movable diaphragm blade 506 has a hole 506-*a* and an oblong hole 506-*b*. Six pins 507-*a*1, 507-*a*2, 507-*a*3, 507-*a*4, 507-*a*5, and 507-*a*6 are provided on the ring portion of a rotary member (turbine) 507. An oblong hole 507-*b* is provided on the lever portion of the rotary member 507. A movable arm 508 has sub-arms 508-*c* and 508-*d* extending in two different directions. Pins 508-*a* and 508-*b* are formed at the tips of the sub-arms 508-*c* and 508-*d*, respectively. A first end of a cylindrical electroactive polymer actuator (driving source) 510 is fixed, whereas a second end is coupled with the pin 508-*b* of the arm 508. The drawings also illustrate fixed pins 511, 512, 513, 514, 515, and 516, and an imaginary effective diameter 509 where light passes through.

The diaphragm device having the above-described structure operates as described below.

The electroactive polymer actuator 510 stretches when a driving voltage is applied. When the application of the voltage to is stopped, the electroactive polymer actuator 510 contracts and stays contracted. The stretching and contracting of the electroactive polymer actuator 510 is used as a driving force to rotate the arm 508 around axis X in a reciprocating manner.

Since the pin 508-*a* of the arm 508 is engaged with the oblong hole 507-*b* of the rotary member 507, when the arm 508 rotates to the right around axis X, the rotary member 507 rotates to the left around the optical axis o. When the arm 508 rotates to the left around axis X, the rotary member 507 rotates to the right around the optical axis o. The six pins 507-*a*1, 507-*a*2, 507-*a*3, 507-*a*4, 507-*a*5, and 507-*a*6 provided on the ring portion of a rotary member 507 are engaged with the oblong holes 501-*b*, 502-*b*, 503-*b*, 504-*b*, 505-*b*, and 506-*b*, respectively, of the diaphragm blades 501 to 506. The holes 501-*a*, 502-*a*, 503-*a*, 504-*a*, 505-*a*, and 506-*a* of the diaphragm blades 501 to 506 are engaged with the fixed pins 511, 512, 513, 514, 515, and 516. When the rotary member 507 rotates to the left around the optical axis o, the diaphragm blades 501 to 506 rotate to the right around the fixed pins 511 to 516, covering the effective diameter 509 to close the diaphragm. When the rotary member 507 rotates to the right around the optical axis O, the diaphragm blades 501 to 506 rotate to the left around the fixed pins 511 to 516, being moved out of alignment with the effective diameter 509 to open the diaphragm. In other words, when the arm 508 rotates to the right (refer to FIG. 7A), the diaphragm blades 501 to 506 cover the effective diameter 509, closing the diaphragm. When the arm 508 rotates to the left (refer to FIG. 7B), the diaphragm blades 501 to 506 move out from the effective diameter 509, opening the diaphragm.

Figure 8A:
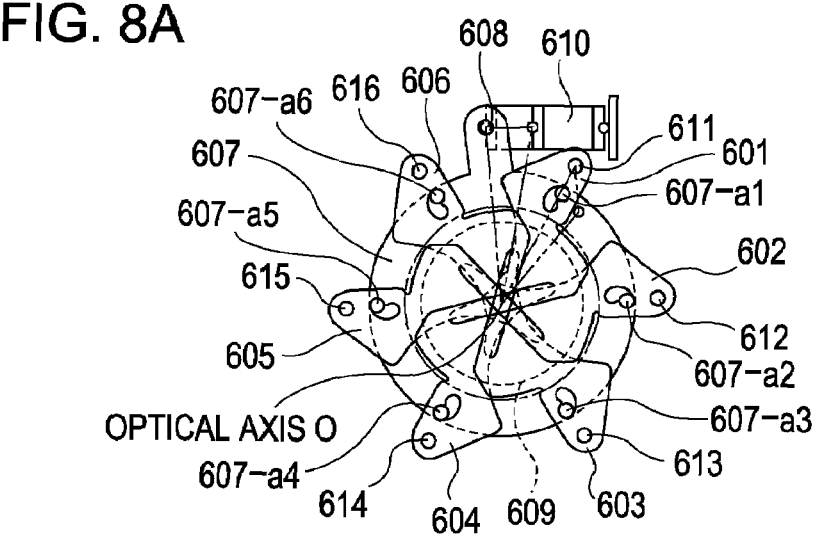
FIGS. 8A, 8B, and 8C illustrate the structure of a diaphragm device according to a sixth embodiment.
Figure 8B:
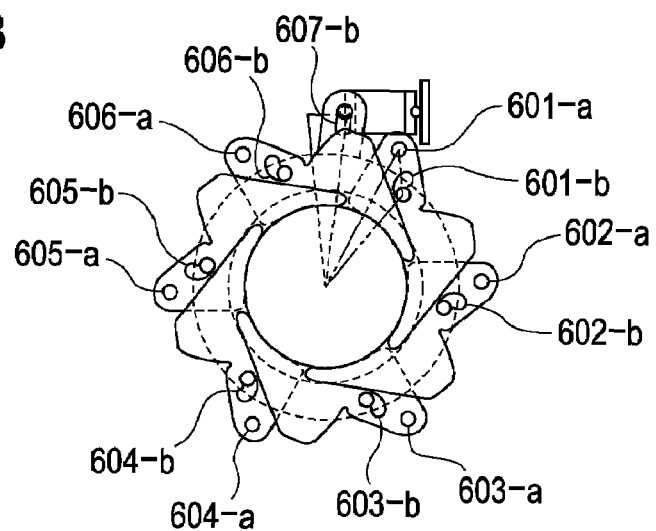
Figure 8C:
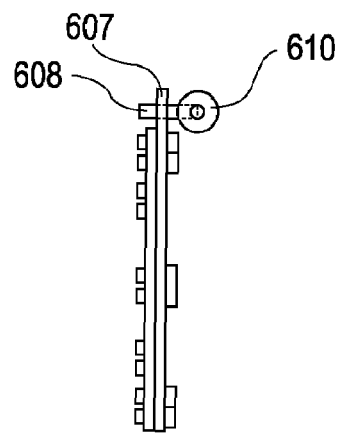
Figure 9A:
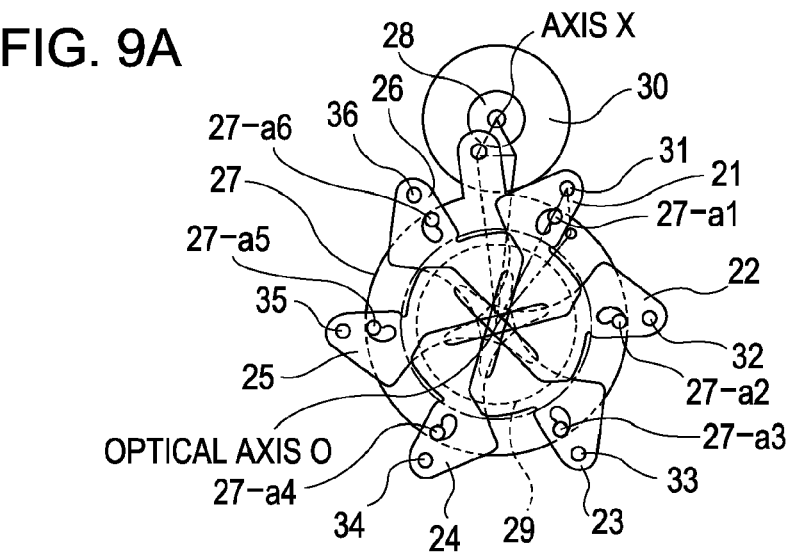
FIGS. 9A, 9B, and 9C illustrate the structure of another known diaphragm device.
Figure 9B:
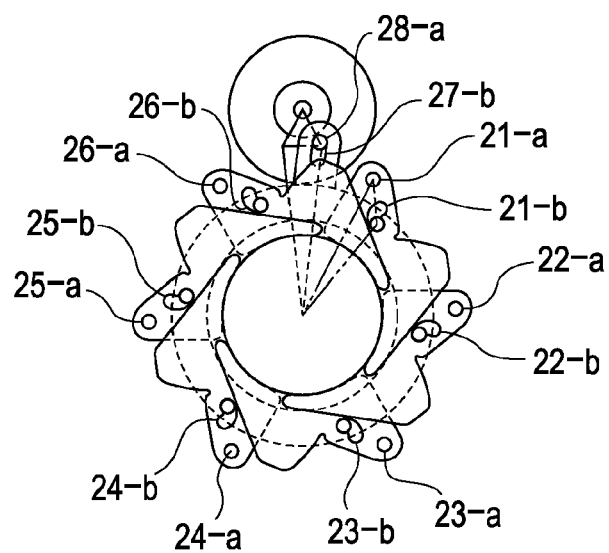
Figure 9C:
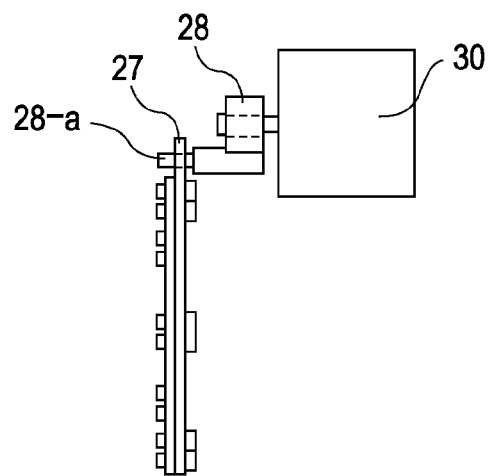

FIGS. 8A to 8C illustrate a diaphragm device according to a sixth embodiment. FIG. 8A is a front view of the diaphragm device with the diaphragm closed; FIG. 8B is a front view of the diaphragm device with the diaphragm open; and FIG. 8C is a side view of the diaphragm device. As illustrated in FIGS. 8A to 8C, a first movable diaphragm blade 601 has a hole 601-*a* and an oblong hole 601-*b*. A second movable diaphragm blade 602 has a hole 602-*a* and an oblong hole 602-*b*. A third movable diaphragm blade 603 has a hole 603-*a* and an oblong hole 603-*b*. A fourth movable diaphragm blade 604 has a hole 604-*a* and an oblong hole 604-*b*. A fifth movable diaphragm blade 605 has a hole 605-*a* and an oblong hole 605-*b*. A sixth movable diaphragm blade 606 has a hole 606-*a* and an oblong hole 606-*b*. Six pins 607-*a*1, 607-*a*2, 607-*a*3, 607-*a*4, 607-*a*5, and 607-*a*6 are provided on the ring portion of a rotary member 607. An oblong hole 607-*b* is provided on the lever portion of the rotary member 607. A movable pin 608 is provided. A first end of a cylindrical electroactive polymer actuator (driving source) 610 is fixed, whereas a second end is coupled with the pin 608. The drawings also illustrate fixed pins 611, 612, 613, 614, 615, and 616, and an imaginary effective diameter 609 where light passes through.

The diaphragm device having the above-described structure operates as described below.

The electroactive polymer actuator 610 stretches when a driving voltage is applied. When the application of the voltage to is stopped, the electroactive polymer actuator 610 contracts and stays contracted. The stretching and contracting of the electroactive polymer actuator 610 is used as a driving force to horizontally move the pin 608 in a reciprocating manner. Since the pin 608 is engaged with the oblong hole 607-*b* of the rotary member 607, when the pin 608 moves to the left, the rotary member 607 rotates to the left around the optical axis o. When the pin 608 moves to the right, the rotary member 607 rotates to the right around the optical axis o. The six pins 607-*a*1, 607-*a*2, 607-*a*3, 607-*a*4, 607-*a*5, and 607-*a*6 provided on the ring portion of a rotary member 607 are engaged with the oblong holes 601-*b*, 602-*b*, 603-*b*, 604-*b*, 605-*b*, and 606-*b*, respectively, of the diaphragm blades 601 to 606. The holes 601-*a*, 602-*a*, 603-*a*, 604-*a*, 605-*a*, and 606-*a* of the diaphragm blades 601 to 606 are engaged with the fixed pins 611, 612, 613, 614, 615, and 616. In this way, when the rotary member 607 rotates to the left around the optical axis o, the diaphragm blades 601 to 606 rotate to the right around the fixed pins 611 to 616, covering the effective diameter 609 to close the diaphragm. When the rotary member 607 rotates to the right around the optical axis O, the diaphragm blades 601 to 606 rotate to the left around the fixed pins 611 to 616, being moved out of alignment with the effective diameter 609 to open the diaphragm. In other words, when the pin 608 is moved to the left (refer to FIG. 8A), the diaphragm blades 601 to 606 cover the effective diameter 609, closing the diaphragm. When the pin 608 is moved to the right (refer to FIG. 8B), the diaphragm blades 601 to 606 move out from the effective diameter 609, opening the diaphragm.

Figure 12A:
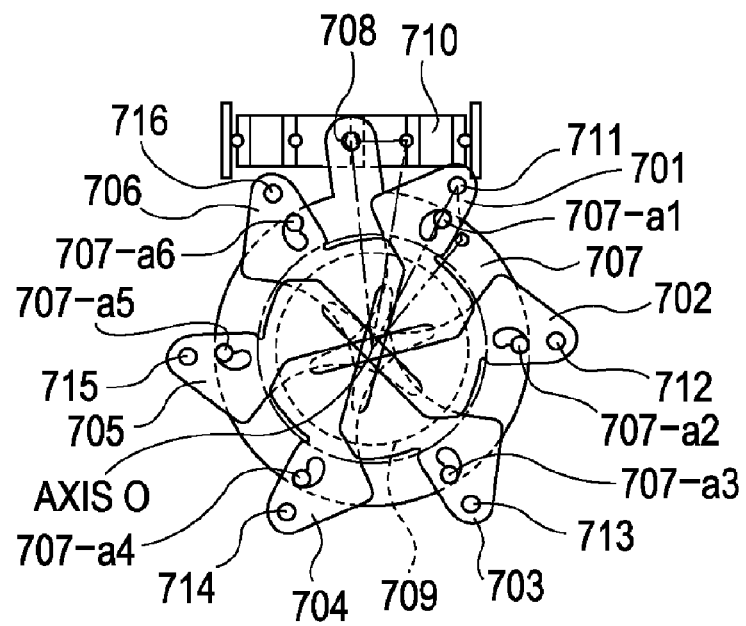
FIGS. 12A, 12B, 12C, and 12D illustrate the structure of a diaphragm device according to a seventh embodiment.
Figure 12B:
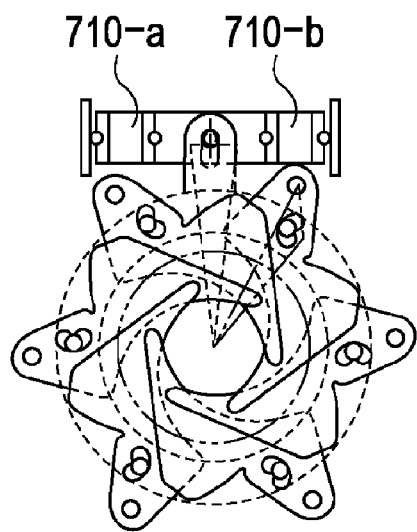
Figure 12C:
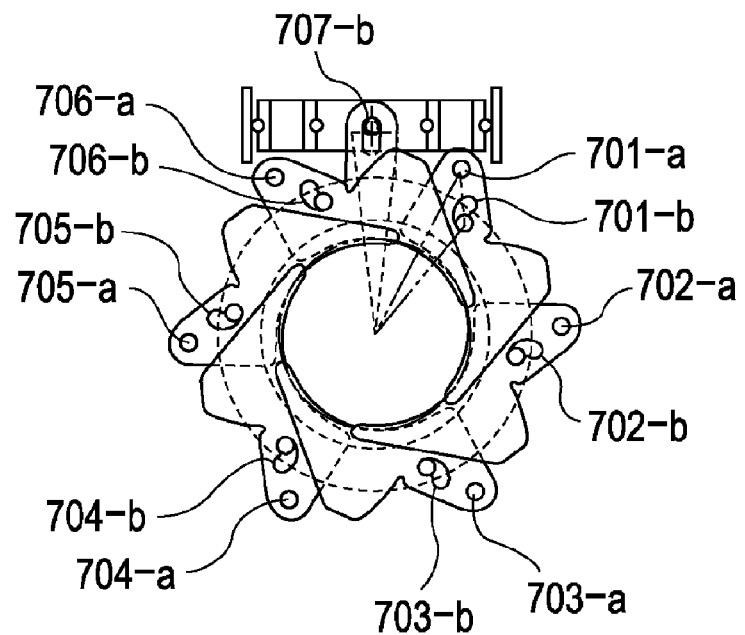
Figure 12D:
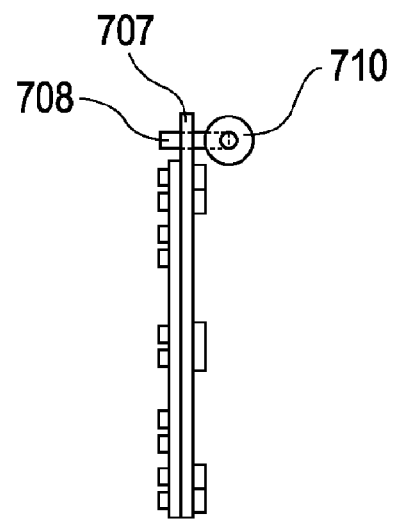

FIGS. 12A to 12C illustrate a diaphragm device according to a sixth embodiment. FIG. 12A is a front view of the diaphragm device with the diaphragm closed; FIG. 12B is a front view of the diaphragm device with the diaphragm half open; FIG. 12C is a front view of the diaphragm device with the diaphragm full open; and FIG. 12D is a side view of the diaphragm device. In this embodiment, one of the electroactive polymer actuators illustrated in FIGS. 13 to 17 is used. As illustrated FIGS. 12A to 12C, a first movable diaphragm blade 701 has a hole 701-*a* and an oblong hole 701-*b*. A second movable diaphragm blade 702 has a hole 702-*a* and an oblong hole 702-*b*. A third movable diaphragm blade 703 has a hole 703-*a* and an oblong hole 703-*b*. A fourth movable diaphragm blade 704 has a hole 704-*a* and an oblong hole 704-*b*. A fifth movable diaphragm blade 705 has a hole 705-*a* and an oblong hole 705-*b*. A sixth movable diaphragm blade 706 has a hole 706-*a* and an oblong hole 706-*b*. Six pins 707-*a*1, 707-*a*2, 707-*a*3, 707-*a*4, 707-*a*5, and 707-*a*6 are provided on the ring portion of a rotary member 707. An oblong hole 707-*b* is provided on the lever portion of the rotary member 707. A movable pin 708 is provided. A first end of a cylindrical electroactive polymer actuator unit (driving source) 710 is fixed, and a second end is also fixed. The electroactive polymer actuator unit 710 includes two coupled electroactive polymer actuators 710-*a* and 710-*b*. The movable pin 708 is provided at substantially the center of the electroactive polymer actuator unit 710 in the longitudinal direction. The drawings also illustrate fixed pins 711, 712, 713, 714, 715, and 716, and an imaginary effective diameter 709 where light passes through.

The diaphragm device having the above-described structure operates as described below.

The electroactive polymer actuator unit 710 generates a driving force by stretching and contracting. The driving force horizontally moves the pin 708 in a reciprocating manner. Since the pin 708 is engaged with the oblong hole 707-*b* of the rotary member 707, when the pin 708 is moved to the left, the rotary member 707 rotates to the left around the optical axis o. When the pin 708 is moved to the right, the rotary member 707 rotates to the right around the optical axis o. The six pins 707-*a*1, 707-*a*2, 707-*a*3, 707-*a*4, 707-*a*5, and 707-*a*6 provided on the ring portion of a rotary member 707 are engaged with the oblong holes 701-*b*, 702-*b*, 703-*b*, 704-*b*, 705-*b*, and 706-*b*, respectively, of the diaphragm blades 701 to 706. The holes 701-*a*, 702-*a*, 703-*a*, 704-*a*, 705-*a*, and 706-*a* of the diaphragm blades 701 to 706 are engaged with the fixed pins 711, 712, 713, 714, 715, and 716. In this way, when the rotary member 707 rotates to the left around the optical axis o, the diaphragm blades 701 to 706 rotate to the right around the fixed pins 711 to 716, covering the effective diameter 709 to close the diaphragm. When the rotary member 707 rotates to the right around the optical axis O, the diaphragm blades 701 to 706 rotate to the left around the fixed pins 711 to 716, being moved out of alignment with the effective diameter 709 to open the diaphragm. In other words, when the pin 708 is moved to the left (refer to FIG. 12A), the diaphragm blades 701 to 706 cover the effective diameter 709, closing the diaphragm. When the pin 708 is moved to the right (refer to FIG. 12B), the diaphragm blades 701 to 706 move out from the effective diameter 709, opening the diaphragm.

In this embodiment, when a voltage is not applied to the electroactive polymer actuators 710-a and 710-b, the pin 708 is located in the middle of its moving range. Therefore, a predetermined intermediate aperture (for example, F5.6) can be set. In other words, by controlling the voltage applied to the electroactive polymer actuators 710-a and 710-b, a predetermined aperture value can be set. By applying a voltage that causes the diaphragm to be closed after setting a predetermined aperture value, shutter operation from a predetermined aperture value can be carried out.

The diaphragm device may have a structure, such as that described in U.S. Pat. No. 6,809,462, in which the aperture value is determined by detecting the change in the distance between the electrodes caused by applying a voltage to the electroactive polymer actuators or the change in resistance with a known circuit, such as a resonator circuit.

Figure 10:
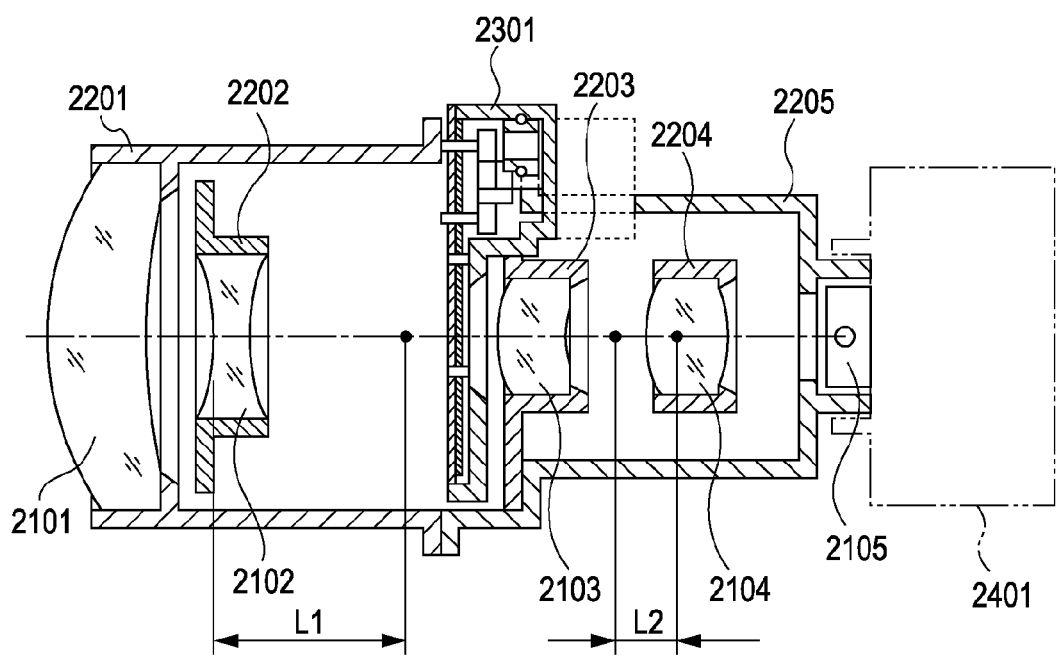
FIG. 10 illustrates the structure of an image-capturing lens unit including a diaphragm device according to an embodiment present invention.

FIG. 10 illustrates an image-capturing lens unit including the diaphragm device according to the second embodiment.

As illustrated in FIG. 10, a fixed front lens 2101 fixed to a front barrel 2201. A variable power lens 2102 is movable within the distance L1. The position of the variable power lens 2102 in controlled in the direction of the optical axis by an actuator not shown in the drawings so as to provide a focal length variable function together with a variable lens frame 2202. A fixed afocal lens 2103 is fixed to an afocal lens frame 2203. A focusing lens 2104 is movable within the distance L2. The position of the focusing lens 2104 in controlled in the direction of the optical axis by an actuator not shown in the drawings so as to provide a focus adjustment function together with a variable lens frame 2204. FIG. 10 also illustrates a fixed rear barrel 2205, an imaging surface 2105 of an image-capturing device, such as a charge-coupled device (CCD), a diaphragm device 2301, and an image-capturing device 2401, such as a camera or a video camera.

Figure 11:
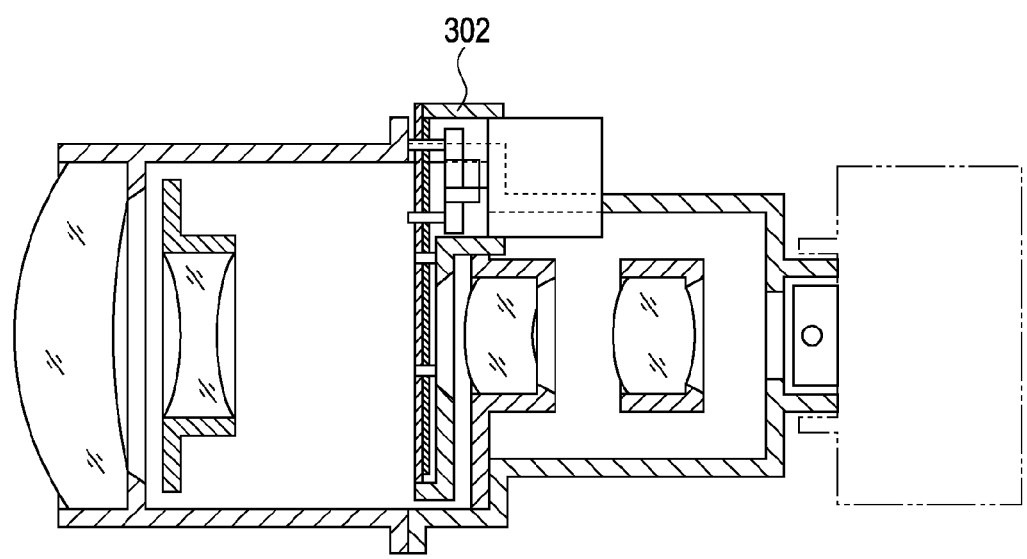
FIG. 11 illustrates the structure of an image-capturing lens unit including a known diaphragm device.

FIG. 11 illustrates an image-capturing lens unit including a known diaphragm device. FIG. 11 illustrates a known diaphragm device 302. The remaining structure is the same as that illustrated in FIG. 10.

By comparing FIGS. 10 and 11, it is noticeable that the area delimited by the dotted line in FIG. 10 can be made smaller.

In the above-described embodiments, the electroactive polymer actuator illustrated in FIG. 17 is used. Instead, however, the electroactive polymer actuator illustrated in FIG. 21 may be used. The structure of the actuator illustrated in FIG. 21 will be described below with reference to FIGS. 19 to 21.

Figure 19:
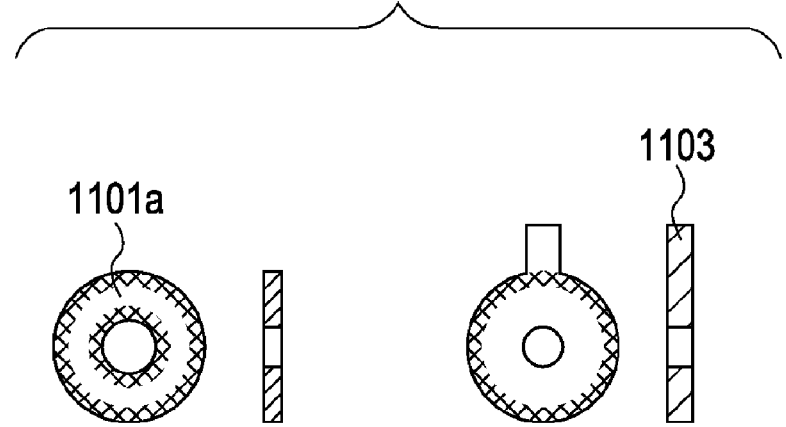
Figure 20:
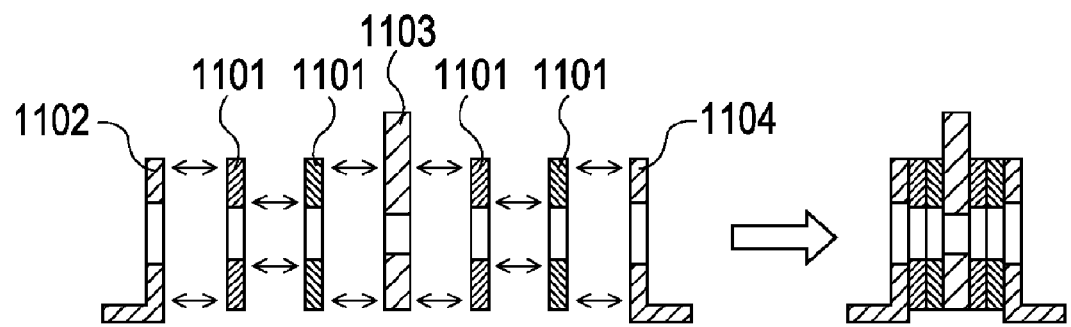
Figure 21:
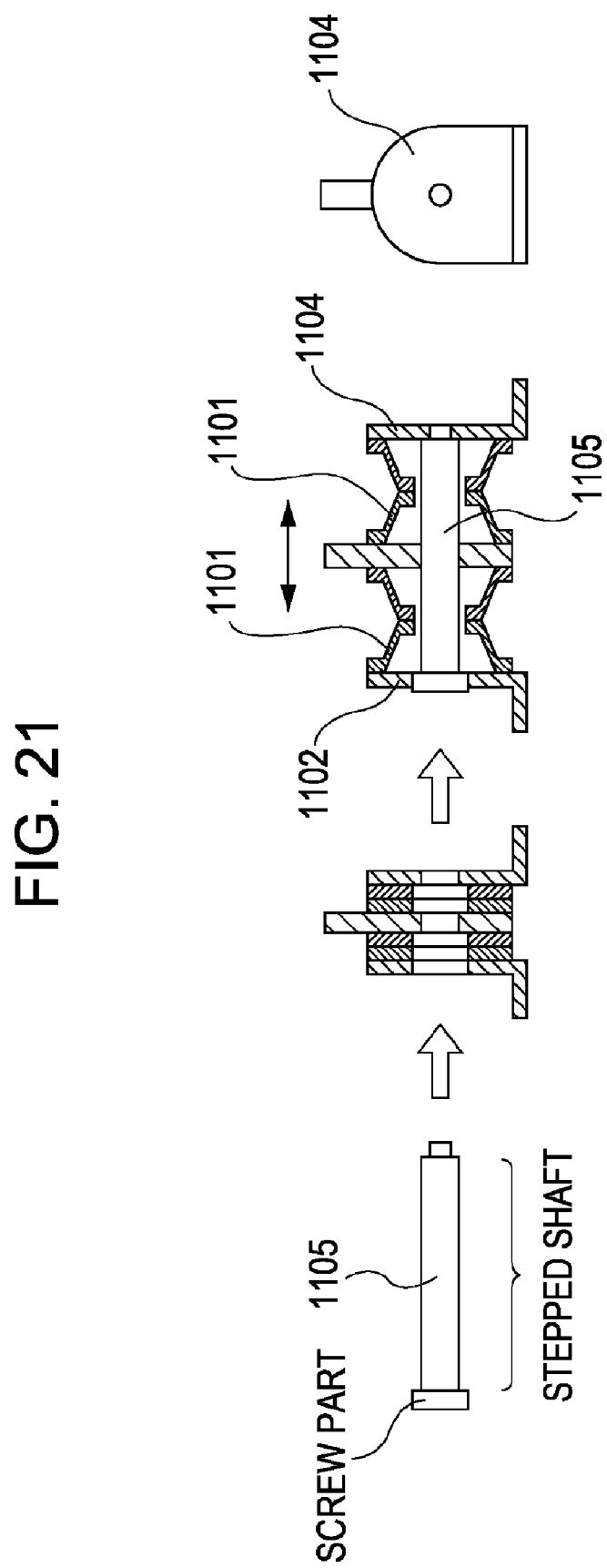

The driving unit of the actuator illustrated in FIG. 21 differs from that of the actuator illustrated in FIG. 17. The remaining structure, such as including two polymer output units and extracting force from a middle point, is basically the same as the actuator illustrated in FIG. 17. The actuator illustrated in FIG. 21 includes a stepped shaft for applying prestrain to the polymers in addition to the plate included in the actuator illustrated in FIG. 17. Circular electroactive polymer films 1101, as FIGS. 19 to 21 illustrate, are the same size. In the above-described structure, the acrylic or silicon dielectric elastomer discussed in U.S. Pat. No. 6,891,317 or a material having the characteristics of Table 1 in "J D W. Madden, "Artificial Muscle Technology: Physical Principles and Naval Prospects." IEEE Journal of Oceanic Engineering, Vol. 29, No. 3, July 2004" is used, but the material used in the embodiments is not limited. On the front and back sides of the polymers, electrodes, such as elastic carbon, are provided. The method and martial of producing the electrodes are not limited.

Holding members 1102, 1103, and 1104, are mechanical members for holding the polymers 1101. The polymers 1101 and the holding members 1102, 1103, and 1104 are fixed by being welded or adhered together. The hatched area shown in FIG. 19 is where the polymer is welded or adhered to the holding members. In FIG. 20, arrows indicate the areas to be welded or adhered in the entire structure. The holding member 1102 and the polymer 1101 are welded or adhered together at the hatched area at the outer peripheral area of the polymer 1101. The holding member 1103 and the polymers 1101 and the holding member 1104 and the polymers 1101 are fixed in the same manner as that of the holding member 1102 and the polymer 1101. The polymers 1101 are fixed to each other by welding or bonding each other together at the hatched areas at the inner peripheral area of the polymers 1101. After welding or bonding the components together as shown in FIG. 20, the distance between the holding members 1102 and 1104 is increased to a predetermined distance with a stepped shaft 1105, as shown in FIG. 21. Then, a screw part 1105a of the stepped shaft 1105 is screwed into a screw hole 1102a of the holding member 1102. The screw part 1105a of the stepped shaft 1105 and the screw hole 1102a of the holding member 1102 are fixed together to each other with an adhesive. The holding member 1103 and the shaft 1105 slide in respect to each other with low friction. At least one of the shaft 1105 and the holding member 1103 may be coated with low-friction coating, such as Teflon, or a lubricant, such as grease, may be applied. The stepped shaft according to this embodiment is not limited, and, as shown in FIG. 17, the entire length may be set by using only a plate.

The stepped shaft 1105 applies prestrain to the polymers, and the polymers are fixed in a stretched state. As described above, it is well known that, by applying prestrain to a polymer, the strength against damage by electrostatic discharge increases.

Characteristic structures of this embodiment are the structure for determining the distance between the holding members 1102 and 1104 with the stepped shaft 1105 while a plurality of polymer films 1101 are stretched and the structure for causing displacement and extracting force from the central side surface of the bellows-like structure of the plurality of polymer films 1101. In this embodiment, similar to the structure illustrated in FIG. 17, the holding member 1103 has a key for used for mechanically connecting a load (i.e., driven member).

This embodiment employs a structure in which a plurality of films having the same shape is stacked in the displacement direction. According to this structure, four circular polymer films are used. Instead, however, only two polymer films may be used to dispose one polymer film on each side of the molding member 1103. Furthermore, a plurality of polymer films, e.g., six, eight, ten polymer films, may be connected. The number of polymer films to be used may be set in accordance with the condition of use. As shown in FIG. 21, the polymer films 1101 are fixed in a manner such that the polymer films 1101 are fixed to the outer peripheral area of the holding member 1102, fixed to each other at their inner peripheral areas, and fixed to the outer peripheral area of the holding member 1103. Instead, the polymer films 1101 may be fixed in a manner such that the polymer films 1101 are fixed to the inner peripheral area of the holding member 1102, fixed to each other at their outer peripheral areas, and fixed to the inner peripheral area of the holding member 1103.

The electrode of the polymer film 1101 is configured such that the outer side (i.e., outer surface of the bellows-like structure) is the ground. The inner side (i.e., inner surface of the bellows-like structure) is the high-voltage side. Accordingly, electrical discharge to external components can be prevented.

With the above-described embodiments, since an electroactive polymer actuator is used as a driving source of a diaphragm device, the size of the driving source of the diaphragm device is reduced, and, moreover, the structure of the diaphragm device is simplified. Thus, the driving source may be disposed more freely, and the size, weight, cost, and energy consumption of the diaphragm device can be reduced.

As pointed out above, the volume of a meter, which is a conventional driving source, is about $\phi 8 \times 8 = 402$ mm$^3$. Now, the approximate volume of the driving source used in the above-described embodiments will be calculated.

If the thrust required for driving a diaphragm blade is set as 10 g, the moving distance of the actuator as ±0.5 mm, the film thickness as 50 μm, the driving voltage as 5 kV, and the relative permittivity ∈r as 3, according to the above-described Expressions 1 and 2, the dimensions of the film that can be move a load of 10 g by 1 mm is about 10×2 mm. When this film is rolled into a cylinder with an inner diameter of 2 mm, the outer diameter is about 3 mm. Therefore, the length of the actuator can be determined by the following calculation: [2 mm×2 films]+[sum of thickness of three holding members]. Accordingly, a small actuator having a length of about 6 mm and an outer diameter of 3 mm is obtained.

As calculated above, the volume of the driving source according to the above-described embodiments is about $\phi 3 \times 6 = 42$ mm$^3$. In other words, the size of the actuator can be reduced by one order of magnitude.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A lens apparatus comprising:
   a lens barrel;
   an image-capturing optical system; and
   a diaphragm device disposed in an optical path of the image-capturing optical system,
   wherein the diaphragm device includes,
      a plurality of diaphragm blades, and
      an electroactive polymer actuator configured to move the plurality of diaphragm blades from a diaphragm-open state to a diaphragm-closed state and from a diaphragm-closed state to a diaphragm-open state,
      wherein the electroactive polymer actuator is a two-phase electroactive polymer actuator, and
      wherein when the two-phase electroactive polymer actuator is in a non-conductive state, the plurality of diaphragm blades is kept at an intermediate diaphragm position.

2. A camera comprising:
   the lens apparatus according to claim 1; and
      a camera main body including an image-capturing device configured to receive light from the lens apparatus.

* * * * *